(12) United States Patent
McElheran et al.

(10) Patent No.: US 6,895,743 B1
(45) Date of Patent: May 24, 2005

(54) LIQUID PROPELLANT ROCKET MOTOR

(76) Inventors: Terry McElheran, 5515 E. Seven Palms Dr., Cave Creek, AZ (US) 85331; William Colburn, 944 South St., Hollister, CA (US) 95026

( * ) Notice: Subject to any disclaimer, the term of this patent is extended or adjusted under 35 U.S.C. 154(b) by 0 days.

(21) Appl. No.: 10/655,723

(22) Filed: Sep. 5, 2003

(51) Int. Cl.[7] .............................................. F02K 9/64
(52) U.S. Cl. ........................ 60/258; 60/265; 60/39.827
(58) Field of Search .......................... 60/257, 258, 265, 60/39.827

(56) References Cited

U.S. PATENT DOCUMENTS 3,407,604 A * 10/1968 Keith et al. .................. 60/217
6,057,693 A * 5/2000 Murphy et al. ............. 324/663
2004/0128980 A1 * 7/2004 Calabro ........................ 60/257

* cited by examiner

*Primary Examiner*—Ehud Gartenberg
(74) *Attorney, Agent, or Firm*—Fellers, Snider, Blankenship, Bailey & Tippens, P.C.

(57) ABSTRACT

The present invention provides a transpiration cooled rocket motor which operates at low combustion pressures, inherently provides stabilized combustion, and operates over a desired range of L-star. In a preferred embodiment the inventive transpiration cooled rocket motor includes: a housing; a porous injector sleeve; a propellant injector; and a nozzle. Preferably the injector sleeve lines the inside walls of the housing such that the inside volume of the sleeve forms the chamber for the motor. Liquid fuel passes inwardly through the pores of the injector sleeve and is injected from the sleeve into the chamber, thus cooling the walls of the rocket motor.

10 Claims, 2 Drawing Sheets

LIQUID PROPELLANT ROCKET MOTOR

BACKGROUND OF THE INVENTION

1. Field of the Invention

The present invention relates to a liquid propellant rocket motor. More particularly, but not by way of limitation, the present invention relates to a rocket motor which is capable of very long run times without degradation or self destruction.

2. Background of the Invention

Generally speaking, liquid propellant rocket motors are well known in the art but are subject to constant evolution and improvement. In such motors, liquid fuel is typically combusted in the presence of an oxidizer. Hot exhaust gases are discharged through a nozzle to generate thrust. While there are any number of fuel and oxidizer combinations, kerosene and alcohol are common fuels and oxygen, stored in compressed liquid form, and nitrous oxide are common oxidizers.

As will be appreciated by those familiar with rocket motor architecture, the inner chamber of a rocket motor is subjected to high temperatures, relatively high pressure, and potentially, an abundance of oxygen, a combination which leads to erosion or consumption of the inside surfaces and weakening of the walls of the motor. Even with well designed motors, these conditions set a maximum operating life of the motor, often measured in seconds, and, in a poorly designed motor, these conditions often lead to catastrophic failure.

Techniques have been developed to protect the motor from such degradation or self-destruction, but there are limitations or problems associated with these solutions. For example, it is well known to coat the inside of the engine with an ablative liner. Typically, an ablative liner is laminated to the inside surface of the motor housing. The liner insulates the wall to prevent failure of the motor and is designed to ablate, either through erosion, sublimation, or melting, at a rate which provides protection over the expected burn time of the engine. As the liner ablates, the hot ablated material is ejected from the engine by the exhaust gases, thus expelling the hottest wall material from the engine. While ablative liners are relatively inexpensive, they have a fairly short operating life and are consumed during use.

Another example of engine architecture employed to protect the rocket motor from self-destruction is regenerative cooling. In a regeneratively cooled rocket motor, outer shell of the rocket motor includes a spiral spacer sandwiched between an inner wall and an outer wall. Fuel is swirled down the walls of the motor before being injected into the motor. The result is that the wall is cooled by the fuel to prevent over heating and the subsequent damage. Regeneratively cooled motors are relatively complex and expensive. However, operating times for regenerative motors are often measured in minutes, rather than seconds.

Yet another method of engine cooling is transpiration cooling. Transpiration cooling was first considered in late 1940's as a method of rocket motor cooling but early attempts were abandoned upon the successful development of a regeneratively cooled motor. Transpiration cooling, or sweat cooling, generally involves the injection of fluid or gas through a porous material placed between the motor wall and the combusting fuel. The porous material is cooled by the liquid fuel as it passes through.

Another area of concern with liquid propellant motors is ignition. If fuel and oxidizer collect in the chamber before ignition, the engine may experience a hard start, and possibly a resultant disassembly. In many cases, a rocket motor is ignited once and operates until its fuel and oxidizer stores are consumed. In such cases, motors are typically ignited by first igniting something which will ignite easily and burn furiously, i.e., a chunk of solid rocket fuel or the like. Obviously, this technique, the pyrotechnic ignitor, is impractical for applications where a motor will experience intermittent use, such as a thrustor for an orbiting craft or a steering thrustor.

SUMMARY OF THE INVENTION

The present invention provides a rocket motor which overcomes the limitations and alleviates the problems discussed above. In a preferred embodiment the present invention provides a transpiration cooled rocket motor comprising: a housing; a porous injector sleeve; a propellant injector; and a nozzle. Preferably the injector sleeve lines the inside walls of the housing such that the inside volume of the sleeve forms the chamber for the motor. Fuel passes inwardly through the pores of the injector sleeve and is injected from the sleeve into the chamber. Thus, the outer wall of the engine is cooled by the liquid fuel.

In one preferred embodiment, oxidizer is injected into the chamber through a metal tube which is electrically insulated from the housing. The porous injector sleeve is formed from a material which, when dry, is a dielectric. If a conductive fuel is used, the injector sleeve will become conductive when filled with fuel. If a sufficient voltage is placed between the metal injector tube and the sleeve arcing will take place only when the motor is ready to start. Assuming an ignition voltage is present, when fuel is not present, no arcing can occur, once fuel is present, arcing will occur automatically. Thus, the inventive rocket motor is not prone to hard starts. Further, since the inventive engine is suitable for electrical ignition, it is particularly well suited to applications where intermittent motor operation is required.

In one aspect of the invention, an inherently safe rocket motor may be constructed. The motor is inherently safe in that the conductivity of the outer shell is indicative of the presence of liquid fuel. A drop in the conductivity is indicative of a loss of cooling and the engine can be shut down to prevent damage or disassembly.

In another aspect of the present invention, L-star of the rocket motor is preferably in the range of 26–35 which results in a relatively compact motor. L-star is well known in the art, but generally described as the ratio of the volume of the chamber to the area of the throat, the smallest constricted area, of the nozzle.

In another aspect of the present invention, the porous injector sleeve is cast from a ceramic material and precision finished, if necessary. The fired material comprises pores which are connected in a sponge-like manner, permitting fuel to be absorbed and, after passing trough the sleeve, available for combustion at the inner wall while providing cooling of the chamber wall.

Further objects, features, and advantages of the present invention will be apparent to those skilled in the art upon examining the accompanying drawings and upon reading the following description of the preferred embodiments.

DESCRIPTION OF THE PREFERRED EMBODIMENTS

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
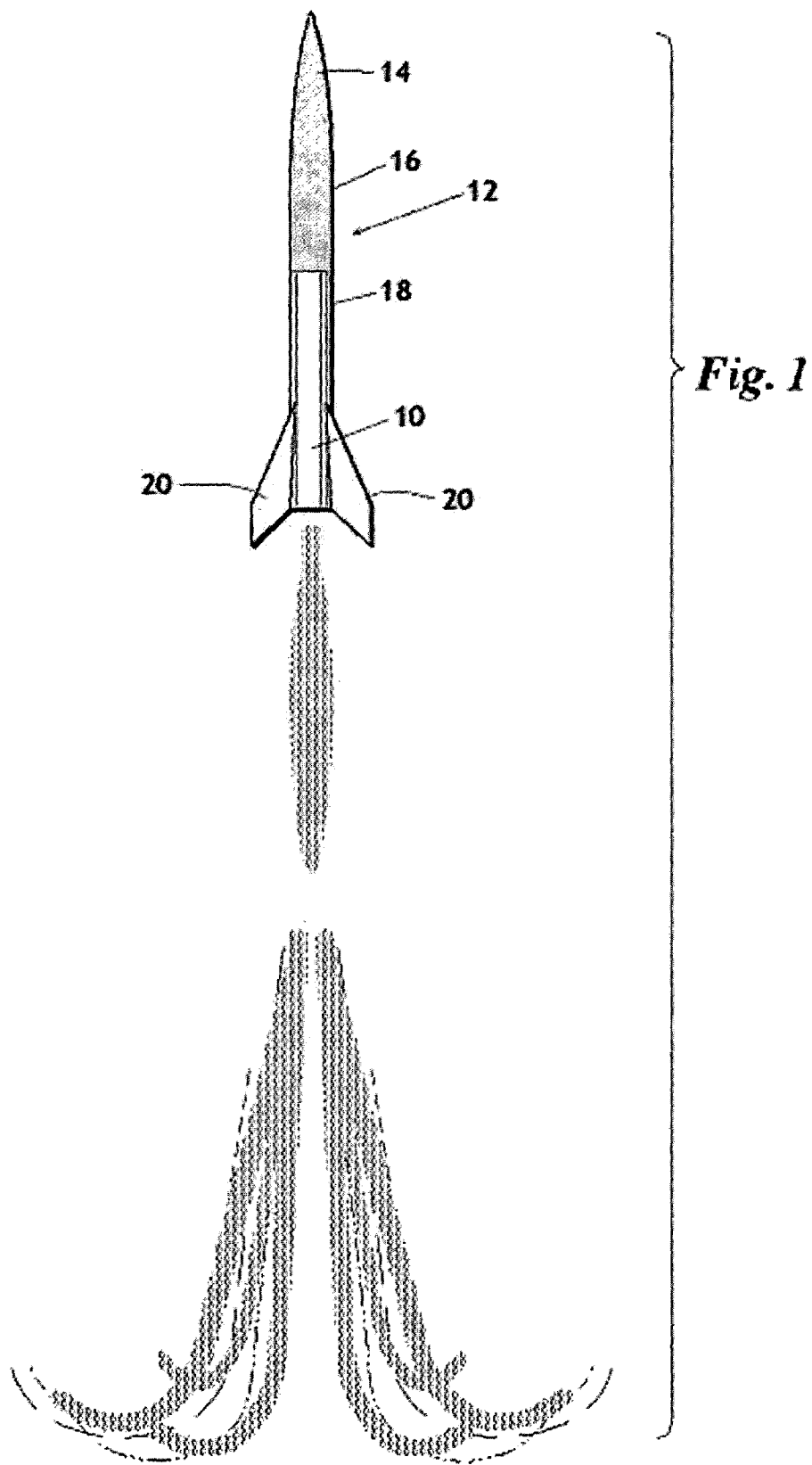
FIG. 1 shows the inventive rocket motor in use in its general environment.

Referring now to the drawings, wherein like reference numerals indicate the same parts throughout the several views, the inventive rocket motor 10 is shown in its general environment in FIG. 1. In a typical application, rocket motor 10 provides thrust to propel rocket 12 towards apogee, or its final destination. Rocket 12 includes: nose cone 14; payload section 16; fuel tanks 18; and engine 10. Fins 20 act on passing air to maintain rocket 12 in relatively straight flight.

It should be noted that rocket motor 10 is also well suited to providing second-stage power or, when used as part of a larger system, to provide thrust for steering or to maintain, or adjust, orbit when used on an orbiting craft. Rocket motor 10 may also be used to propel aerodynamic craft.

Figure 2:
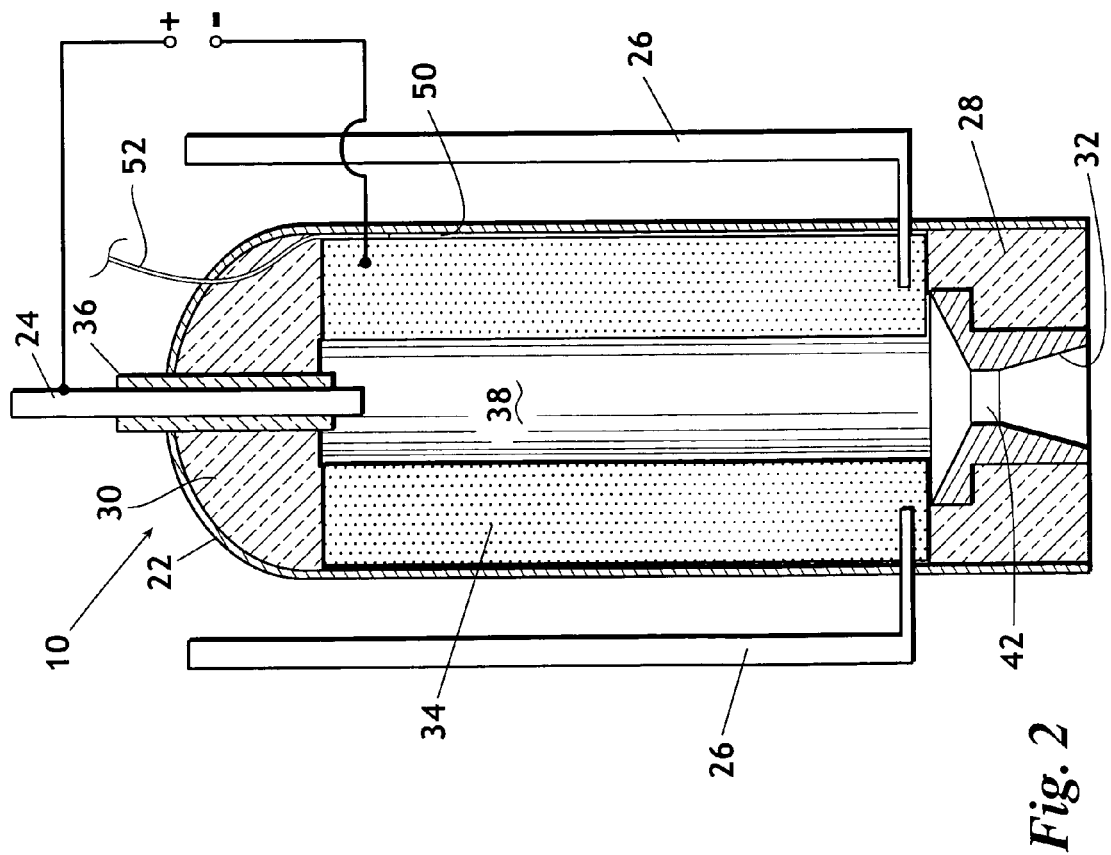
FIG. 2 provides a cross section view of the inventive rocket motor.

With reference to FIG. 2, in a preferred embodiment rocket motor 10 comprises: housing 22; oxidizer injector tube 24; fuel injector tubes 26; ceramic potting material 28 and 30; nozzle 32; porous injector sleeve 34; and electrical insulator 36. Preferably housing 22 is formed of a lightweight metal such as aluminum, however many materials, both metallic and nonmetallic are suitable for housing 22.

A key feature of motor 10 is transpiration cooling. Transpiration cooling is accomplished by forcing liquid fuel from injector tubes 26 through porous media 34 which lines the walls of combustion chamber 38 of motor 10. The flow of fuel through media 34 cools the walls of chamber 38 and prevents damage to the engine from the heat of combustion. In contrast to previous transpiration cooled engines, in the inventive rocket motor, all of one of the propellants, either fuel or oxidizer, if injected via the porous media. Unlike ablative liners, there is no significant ablating of media 34 during the operation of the motor.

Figure 3:
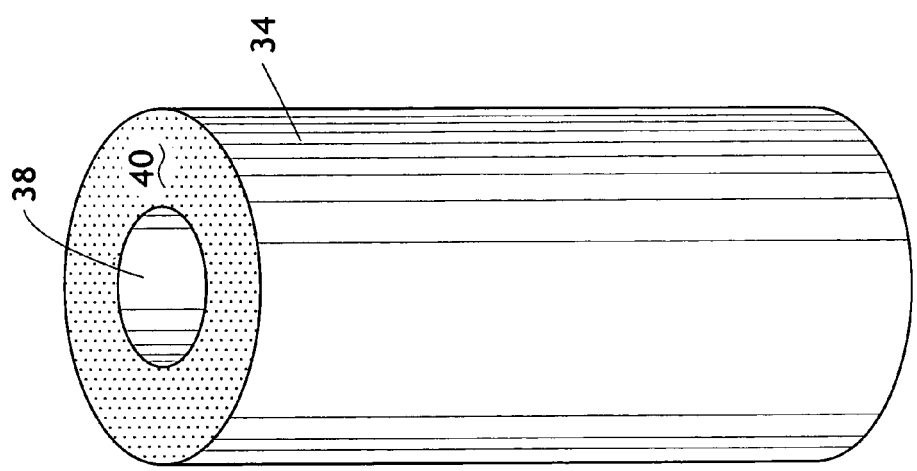
FIG. 3 provides perspective view of a ceramic sleeve as used in a preferred embodiment of the inventive rocket motor.

With further reference to FIG. 3, media 34 is preferably a cylinder formed of an open-cell porous ceramic material. In a preferred embodiment alumino-silicate ceramic material, otherwise known as MULLITE or chemically $3Al_2O_3.2SiO_2$, is employed, however other ceramic materials are also suitable such as magnesia and zirconia silicates. In such materials, pores are interconnected in a sponge-like manner permitting fuel to be absorbed in the material and, after flowing through the material, released into combustion chamber 38. Media 34 may be precision cast in a mold and fired according to normal ceramic processing techniques or cast and fired as a cylinder and machined to properly size media 34.

Important characteristics of media 34 are: 1) the pores are of such size that interfacial tension will retain the liquid fuel; and 2) the ceramic is hydrophilic to absorb a polar fuel such that wet media becomes electrically conductive.

As will be apparent to those skilled in the art, rocket motor design is constrained by the range of L-star suitable for a particular motor architecture. Generally speaking, L-star is defined as the ratio of the volume of the combustion chamber over the area of the throat of the nozzle. In the present invention, L-star has been determined to in the range of 26 to 35. An L-star in this range allows a motor constructed according to the present invention to be relatively compact.

With L-star known, it is possible to determine the inside volume of the combustion chamber based on desired thrust and nozzle configuration. Such calculations are well known in the art. After the inside diameter of media 34 is determined, the thickness of wall 40 can be determined by considering: 1) the thickness required to hold the requisite amount of fuel to sufficiently cool the chamber wall; and 2) provide sufficient fuel flow for steady and efficient combustion. By way of example and not limitation, an example of suitable dimensions for media 34 in a fairly small rocket motor are a chamber diameter of 0.6 inches, an outside diameter of 1.5 inches, and a length of five inches for use with a nozzle having a 0.18 inch diameter throat. As will be apparent to those skilled in the art, for any inside diameter and length of media 34, there is a range of nozzle throat diameters which will yield the aforementioned L-star range. The range of suitable wall thicknesses is determined, at the high end, by the amount of fuel which must flow through the pores of the material in light of the pressure driving the fuel, and at the low end, by the amount of fuel needed to cool the motor.

Nozzle 32 is preferably formed of a metal suited to withstand the heat produced by motor 10, i.e., tungsten, molybdenum, etc. It should be noted, however, that a number of other materials are also suitable for use in nozzle 32, for example, graphite or copper. Nozzle 32 is preferably formed as a conventional nozzle having throat 42. While not critical to the design of the motor, in the preferred embodiment, media 34 and nozzle 32 are secured in housing 22 with ceramic potting compound 28. The composition of ceramic potting compound 28 is not critical and, by way of example and not limitation, suitable materials include alumino-silicate based ceramics or portland cement with a silica filler. It should also be noted that the stress placed on nozzle 32 by the escaping exhaust gasses can be reduced by judicious placement of fuel injector tubes 26. By injecting cool fuel into media 34 at a point near nozzle 32, effective cooling of nozzle 32 can also be accomplished in the inventive motor.

It should also be noted that oxidizer injector tube 24 and its accompanying electrical insulator 36 can likewise be potted in place with the same, or a similar, material as used to pot the lower end of engine 10. Preferably tube 24 is formed of an electrically conductive material for reasons which will become apparent from the discussion hereinbelow.

In operation, the conductivity of media 34 can be monitored during operation of the fuel. When no fuel is present, media 34 is a dielectric. As fuel is forced through media 34, the pores of media 34 fill with the polar fuel and media 34 becomes conductive. Upon sensing the increase in conductivity of media 34 oxidizer is injected through tube 24 and a high voltage is place between tube 24 and media 34. Since media 34 becomes conductive as it becomes wet with fuel, an electrical arc will fire to discharge the difference in potential between tube 24 and media 34, igniting the oxidizer/fuel mixture in chamber 38.

In the preferred embodiment, the inner surface of porous media 34 evaporates the precise amount of fuel required for the engine to start. Thus, if media 34 is not fully loaded with fuel, the engine simply will not start. With continuous or repeated arcing, the engine will ignite automatically at the desired level of saturation of the porous media. In a typical engine start up sequence, the ignition is first turned on, the flow of oxidizer is started, proper chamber operation is verified, then the flow of fuel through the porous media is started. In such a startup procedure, the inventive rocket motor will not explode on start. Further, the motor will only run over a narrow range of oxidizer to fuel ratios.

While electrical ignition is not critical to operation of the inventive motor, it should be noted that the inventive motor is particularly well suited to applications which require multiple motor starts and stops. In such applications, the ease with which the inventive engine can be monitored for the presence of fuel, and the ease with which an electrical can be introduced to the combustion chamber are particularly attractive.

It should also be noted that the inventive motor can be operated in an inherently safe manner. It is well known that collection of fuel and oxidizer in the combustion chamber can lead to an unscheduled disassembly of a rocket motor. Since the presence, or absence, of fuel can be easily monitored by simply measuring the conductance of media 34, the flow of oxidizer can easily be controlled to match the flow of fuel.

As an added safety feature, with further reference to FIG. 2, fibre optic materia 52 can be routed to the area 50 between housing 22 and porous media 34. By monitoring the opposite end of fibre 52, it can be determined if there is a failure of media 34. If such a failure is detected, motor 10 can be shut off to prevent a complete disassembly of the vehicle.

It should be further noted that, since the heated inner surface acts to stabilize the combustion, the engine operates at low values of L-star, and the nozzle is cooled by fuel purposely injected at the aft of the end of the motor, the inventive motor is capable of very long runs without degradation or self destruction.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention.

What is claimed is:

1. A liquid propellant rocket motor comprising:
   a motor housing;
   a chamber housed within said motor housing, wherein the liquid propellant is combusted in said chamber;
   a porous media in fluid communication with said chamber such that all of the liquid propellant passes through the pores of said porous media for injection into said chamber; wherein said porous media is a ceramic material that is nonconductive when dry, and wherein the liquid propellant is a polar liquid such that said porous media is nonconductive when fuel is not present and becomes conductive when fuel is present; further comprising an electrode extending into said chamber, wherein the rocket motor is ignited by placing a high voltage across said electrode and said porous media, said high voltage being sufficient to create an electrical arc when said porous media is conductive.

2. The liquid propellant rocket motor of claim 1 wherein flow of the liquid propellant is sensed by measuring the conductivity of said porous media.

3. The liquid propellant rocket motor of claim 1 wherein the L-star of the motor is in the range of 26 to 35.

4. The liquid propellant rocket motor of claim 1 wherein said ceramic material is alumino-silicate material.

5. The liquid propellant rocket motor of claim 1 further comprising:
   an injector tube for injecting liquid propellant into said porous media; and
   a nozzle through which exhaust gasses are discharged from said chamber,
   wherein said injector tube injects liquid propellant into said porous media proximate said nozzle such that said nozzle is cooled by the liquid propellant.

6. The liquid propellant rocket motor of claim 5 wherein said nozzle is formed of copper material.

7. The liquid propellant rocket motor of claim 1 further comprising a fibre optic strand, said fibre optic strand having a first end disposed between said porous media and said motor housing such that light output at a second end of said fibre optic strand is indicative of a failure of said porous material.

8. The liquid propellant rocket motor of claim 1 wherein the liquid propellant is an alcohol.

9. A transpiration cooled rocket motor comprising:
   a housing;
   a chamber housed within said housing, wherein a liquid propellant is combusted in said chamber;
   a porous ceramic media in fluid communication with said chamber such that said liquid propellant passes through the pores of said porous ceramic media for injection into said chamber; wherein said porous ceramic media is nonconductive when dry, and wherein the liquid propellant is a polar liquid such that said porous media is nonconductive when fuel is not present and becomes conductive when fuel is present; further comprising an electrode extending into said chamber, wherein the rocket motor is ignited by placing a high voltage across said electrode and said porous media, said high voltage being sufficient to create an electrical arc when said porous media is conductive.

10. The liquid propellant rocket motor of claim 9 wherein flow of said liquid propellant is sensed by measuring the conductivity of said porous media.

* * * * *